(12) United States Patent
Migita

(10) Patent No.: US 11,474,029 B2
(45) Date of Patent: Oct. 18, 2022

(54) SPECTROPHOTOMETER

(71) Applicant: SHIMADZU CORPORATION, Kyoto (JP)

(72) Inventor: Masataka Migita, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 0 days.

(21) Appl. No.: 17/376,995

(22) Filed: Jul. 15, 2021

(65) Prior Publication Data

US 2022/0034796 A1   Feb. 3, 2022

(30) Foreign Application Priority Data

Aug. 3, 2020  (JP) .............................. JP2020-131558
Jun. 16, 2021 (JP) .............................. JP2021-100126

(51) Int. Cl.
*G01J 3/42* (2006.01)
*G01N 21/35* (2014.01)
*G01J 1/20* (2006.01)

(52) U.S. Cl.
CPC .............. *G01N 21/35* (2013.01); *G01J 1/20* (2013.01); *G01J 3/42* (2013.01); *G01N 2021/3595* (2013.01)

(58) Field of Classification Search
CPC ... G01N 21/35; G01N 2021/3595; G01J 1/20; G01J 3/42; G01J 3/0208; G01J 3/0297; G01J 3/06; G01J 2003/069; G01J 3/45; G01J 3/4535; G01J 2003/4534; G01J 3/108
USPC .......................................... 356/319
See application file for complete search history.

(56) References Cited

U.S. PATENT DOCUMENTS

| 4,412,744 | A | 11/1983 | Lee et al. |
| 7,119,904 | B2 | 10/2006 | Coffin et al. |
| 2018/0284274 | A1* | 10/2018 | LaChapelle ............. G01S 17/86 |
| 2019/0379178 | A1* | 12/2019 | Muramatsu ........... F21V 29/503 |

* cited by examiner

*Primary Examiner* — Md M Rahman
(74) *Attorney, Agent, or Firm* — Muir Patent Law, PLLC

(57) ABSTRACT

A spectrophotometer includes: an infrared light source; an interferometer; a first detector; and a monitor unit. The monitor unit includes: a second detector; and a light amount control unit. The light amount control unit is operable to control the infrared light source such that the amount comes closer to a target light amount, based on the signal. The infrared light source emits light having a first wavelength range and light having a second wavelength range different from the first wavelength range. The second detector includes: a first light detection element; and a second light detection element. The first light detection element outputs to the light amount control unit a first voltage corresponding to the light having the first wavelength range. The second light detection element outputs to the light amount control unit a second voltage corresponding to the light having the second wavelength range.

4 Claims, 7 Drawing Sheets

SPECTROPHOTOMETER

BACKGROUND OF THE INVENTION

Field of the Invention

The present invention relates to a spectrophotometer including an infrared light source, and more particularly to control of the infrared light source.

Description of the Background Art

A spectrophotometer including an infrared light source has been conventionally known. For example, U.S. Pat. No. 7,119,904 discloses a Fourier transform infrared (FTIR) spectrophotometer including a light detector that outputs a signal corresponding to an amount of light emitted from an infrared light source. In the spectrophotometer, based on a voltage difference between a voltage output from the light detector and a target voltage, feedback control of the infrared light source is performed such that the amount of light emitted from the infrared light source is kept constant at a target light amount.

SUMMARY OF THE INVENTION

In the spectrophotometer disclosed in U.S. Pat. No. 7,119,904, laser light is emitted to an interferometer including a moving mirror in order to control the interferometer. Due to multiple reflection or scattering of the laser light in the interferometer, a part of the laser light may reach the light detector. In addition, a component of the light detector usually has a temperature characteristic. Even if the same amount of infrared light is emitted from the infrared light source, the voltage output from the light detector may vary due to the laser light and the temperature characteristic that are disturbances. Therefore, an actual light amount difference between the amount of light emitted from the infrared light source and the target light amount may deviate from a light amount difference corresponding to the voltage difference between the voltage output from the light detector that receives the light and the target voltage. As a result, the feedback control based on the voltage difference may in some cases have difficulty in bringing the amount of light emitted from the infrared light source closer to the target light amount.

The present invention has been made to solve the above-described problem, and an object of the present invention is to improve the accuracy of light amount control of an infrared light source included in a spectrophotometer.

A spectrophotometer according to the present invention includes: an infrared light source; an interferometer; a first detector; and a monitor unit. The infrared light source emits exiting light including light having a wavelength within an infrared range. The interferometer generates interference light based on the exiting light input thereto. The first detector detects light generated based on the interference light that has been output from the interferometer, and has transmitted through or reflected from a sample. The monitor unit monitors an output of the infrared light source. The monitor unit includes: a second detector; and a light amount control unit. The second detector outputs a signal corresponding to an amount of the exiting light. The light amount control unit is operable to control the infrared light source such that the amount comes closer to a target light amount, based on the signal. The infrared light source emits light having a first wavelength range and light having a second wavelength range different from the first wavelength range. The second detector includes: a first light detection element; and a second light detection element. The first light detection element outputs to the light amount control unit a first voltage corresponding to the light having the first wavelength range. The second light detection element outputs to the light amount control unit a second voltage corresponding to the light having the second wavelength range.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
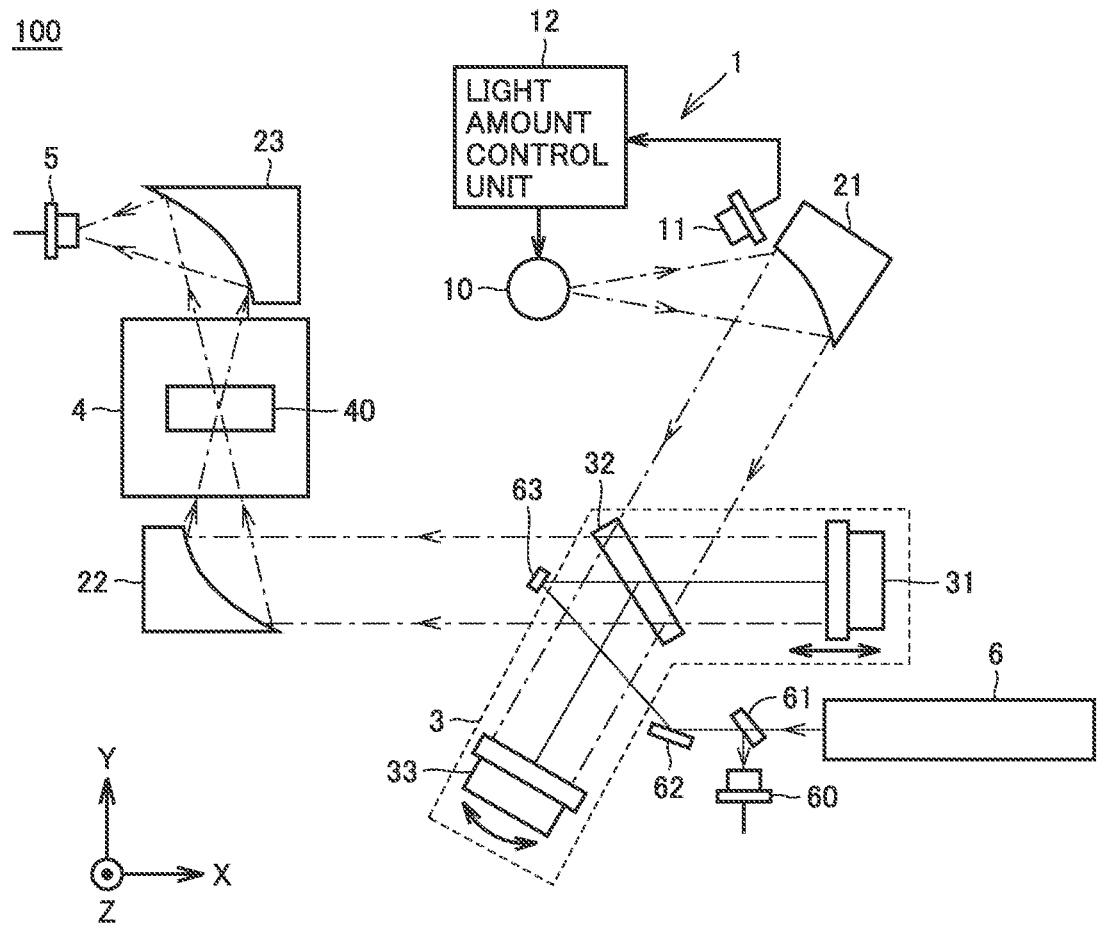
FIG. 1 is a schematic configuration diagram of an FTIR, which is one example of a spectrophotometer according to an embodiment.

An embodiment will be described in detail hereinafter with reference to the drawings, in which the same or corresponding portions are denoted by the same reference characters and description thereof will not be repeated in principle. Hereinafter, a Fourier transform infrared spectrophotometer will be simply referred to as "FTIR".

FIG. 1 is a schematic configuration diagram of an FTIR 100, which is one example of a spectrophotometer according to an embodiment. In FIG. 1, an X axis, a Y axis and a Z axis are orthogonal to each other.

As shown in FIG. 1, FTIR 100 includes an infrared light source 10, a monitor unit 1, a collimating mirror 21, mirrors 22 and 23, an interferometer 3, a sample chamber 4, a light detector 5 (first detector), a laser light source 6 (monochromatic light source), a light detector 60, and mirrors 61, 62 and 63.

Infrared light source 10 emits exiting light including light having a wavelength within an infrared range (infrared light). Monitor unit 1 includes a light detector 11 (second detector) and a light amount control unit 12. Monitor unit 1 monitors an output of infrared light source 10.

Interferometer 3 generates infrared interference light based on the exiting light input from infrared light source 10. Interferometer 3 is implemented by, for example, a Michelson's interferometer and includes a moving mirror 31, a beam splitter (half mirror) 32 and a fixed mirror 33. Moving mirror 31 includes a driving mechanism and is movable linearly in an X axis direction. Fixed mirror 33 is configured to be rotatable about a rotation axis parallel to the Z axis, and a rotation angle of fixed mirror 33 is controlled to follow a movement of moving mirror 31.

A sample 40 is arranged in sample chamber 4. In FTIR 100, the infrared light emitted from infrared light source 10 is guided to interferometer 3, and the infrared interference light from interferometer 3 is guided to light detector 5 through sample 40. Light detector 5 detects light generated based on the infrared interference light that has transmitted through sample 40. FTIR 100 may be configured such that light detector 5 detects light generated based on the infrared interference light that has reflected from sample 40.

FTIR 100 includes a not-shown controller that receives signals from light detectors 5 and 60 and performs analysis, and performs integrated control of FTIR 100. Light amount control unit 12 may be formed as a part of the controller.

Infrared light source 10 is implemented by, for example, a Grover light source, which is a thermal light source using black body radiation from a high-temperature infrared element. The infrared element is formed, for example, by embedding a heating wire in a ceramic such as SiC or SiN. The passage of an electric current through the infrared element causes heating of the infrared element to 1000 K to 1500 K, and radiant light (exiting light) including infrared light is generated from the infrared element and emitted from infrared light source 10. An intensity (radiation spectrum) $B(\lambda, T)$ of light having a wavelength $\lambda$ generated from the infrared element having a temperature T is expressed by the Planck radiation formula given by the following formula (1). In the formula (1), h represents a Planck constant, c represents a light speed, and k represents a Boltzmann constant.

$$B_\lambda(\lambda, T) \propto \frac{1}{\lambda^5} \cdot \frac{1}{\exp(hc/\lambda KT) - 1} d\lambda \quad (1)$$

Figure 2:
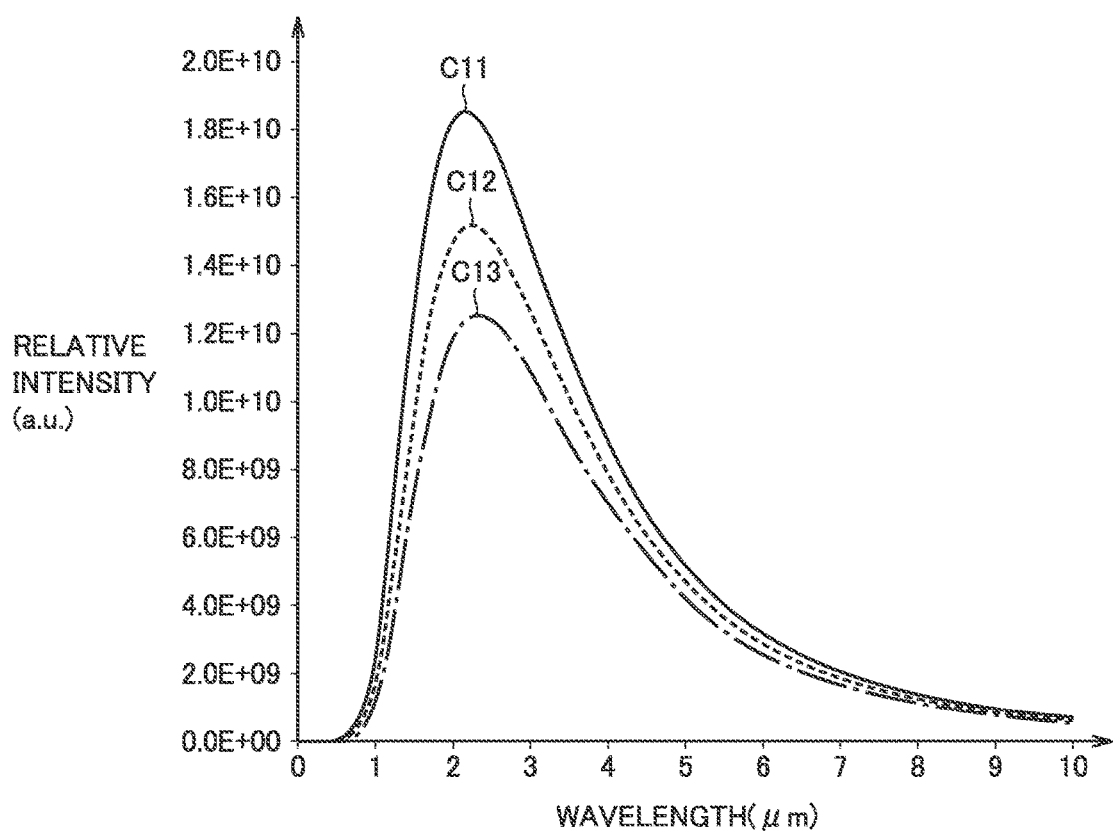
FIG. 2 shows a spectrum of radiant light emitted from an infrared light source.

FIG. 2 shows a spectrum of the radiant light emitted from infrared light source 10. In FIG. 2, a curve C11 represents a radiation spectrum $B(\lambda, T_1)$ at a temperature $T_1$. A curve C12 represents a radiation spectrum $B(\lambda, T_2)$ at a temperature $T_2$ ($<T_1$). A curve C13 represents a radiation spectrum $B(\lambda, T_3)$ at a temperature $T_3$ ($<T_2$). As shown in FIG. 2, each of the radiation spectra $B(\lambda, T_1)$ to $B(\lambda, T_3)$ has a peak (maximum value) of the intensity in a wavelength range of 2 μm to 3 μm included in an infrared range (0.78 μm to 1000 μm).

The infrared light source may be switched in accordance with a wavelength range of the infrared light used for analysis. For example, when the wavelength range is a near-infrared range (0.78 μm to 2 μm), the infrared light source may be switched to a halogen light source. When the wavelength range is a mid-infrared range (2 μm to 4 μm) and a far-infrared range (4 μm to 1000 μm), the infrared light source may be switched to a ceramic light source.

Referring again to FIG. 1, light detector 11 receives the radiant light emitted from infrared light source 10 and outputs a signal corresponding to an amount of the radiant light to light amount control unit 12. Light amount control unit 12 is operable to perform feedback control of infrared light source 10 such that the amount of the radiant light emitted from infrared light source 10 comes closer to a target light amount, based on the signal.

The infrared light emitted as a light bundle diffused from infrared light source 10 is converted by collimating mirror 21 into a parallel light bundle (collimated light), which is guided to beam splitter 32. The infrared light emitted from infrared light source 10 may be converged and then guided to collimating mirror 21 through an aperture.

The infrared light guided to beam splitter 32 is split by beam splitter 32 into infrared light traveling toward moving mirror 31 and infrared light traveling toward fixed mirror 33. Light reflected from moving mirror 31 and light reflected from fixed mirror 33 interfere with each other in beam splitter 32, and thus, the infrared interference light is output from interferometer 3. An intensity (amplitude) of the infrared interference light varies with the movement of moving mirror 31.

Laser light source 6 emits HeNe laser light (monochromatic light) for controlling interferometer 3. The HeNe laser light has a wavelength of 632.8 nm. The HeNe laser light emitted from laser light source 6 passes through mirror 61, and then, is reflected by mirrors 62 and 63 and guided to beam splitter 32. The HeNe laser light guided to beam splitter 32 is split by beam splitter 32 into HeNe laser light traveling toward moving mirror 31 and HeNe laser light traveling toward fixed mirror 33. Light reflected from moving mirror 31 and light reflected from fixed mirror 33 interfere with each other in beam splitter 32, and thus, laser interference light is generated. The laser interference light from beam splitter 32 is guided to light detector 60 by mirrors 63, 62 and 61. When moving mirror 31 moves at a constant speed, an intensity of the laser interference light is detected as a laser light interference fringe signal, which is a sinusoidal wave having a constant frequency. Based on the interference fringe signal, a position and a speed of moving mirror 31 and an angle of fixed mirror 33 are controlled. The monochromatic light emitted from laser light source 6 is not limited to the HeNe laser light.

The infrared interference light output from interferometer 3 is converged on sample 40 by mirror 22. The infrared interference light that has passed through sample 40 is converged on light detector 5 by mirror 23. Based on an intensity signal of the infrared interference light detected by light detector 5, an interferogram is made. Usually, in the interferogram, the vertical axis represents the intensity of the infrared interference light, and the horizontal axis represents an optical path difference between the light reflected from moving mirror 31 and the light reflected from fixed mirror 33. In the interferogram, a peak of the intensity of the infrared interference light occurs when the optical path difference is zero. Fourier transformation of the interferogram provides a power spectrum in which the vertical axis represents an intensity and the horizontal axis represents a wave number (or wavelength). By dividing a power spectrum obtained when sample 40 is irradiated with the infrared interference light by a power spectrum of a background obtained in the absence of sample 40, a reflectivity spectrum or a transmissivity spectrum of sample 40 is obtained. Peak information specific to sample 40 is obtained from these spectra.

Next, in order to describe a problem to be solved in feedback control of infrared light source 10 in FTIR 100, a comparative example of monitor unit 1 will be described with reference to FIG. 3.

Figure 3:
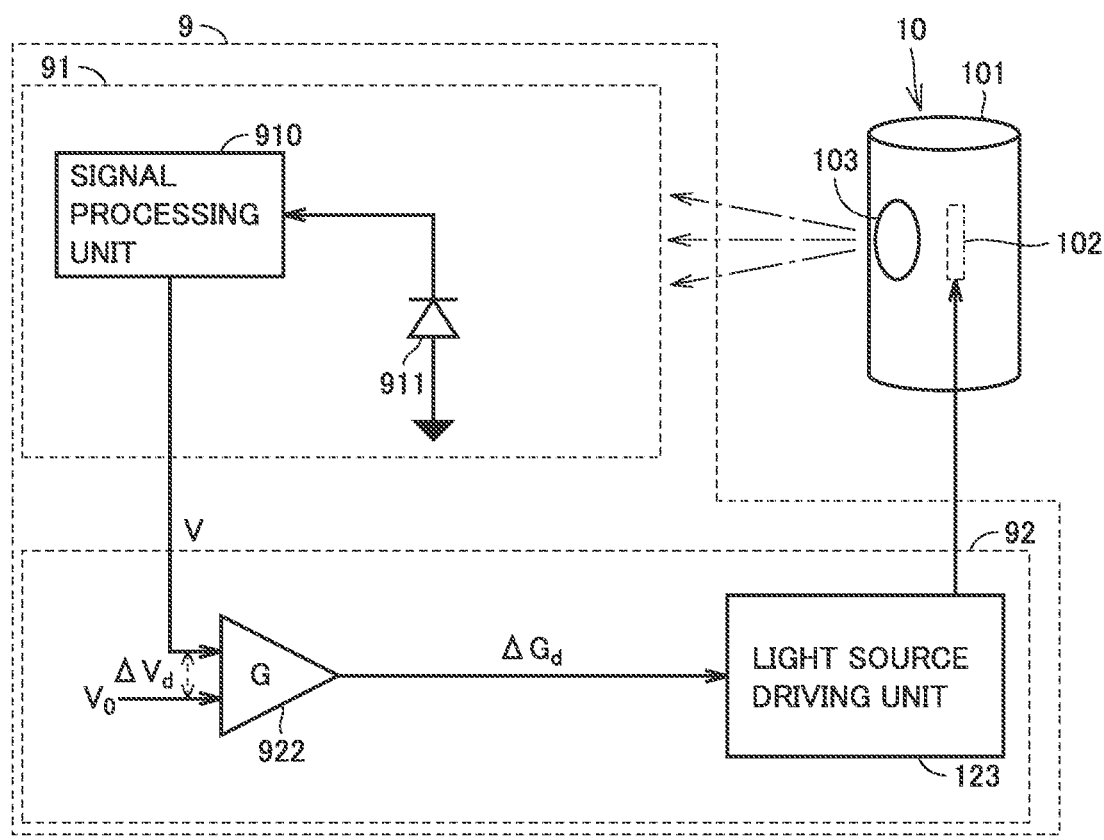
FIG. 3 shows a configuration of a light detector and a light amount control unit according to a comparative example.

FIG. 3 shows a configuration of a monitor unit 9 according to the comparative example. Infrared light source 10 in FIG. 3 corresponds to infrared light source 10 shown in FIG. 1. As shown in FIG. 3, monitor unit 9 includes a light detector 91 and a light amount control unit 92. Infrared light source 10 includes a case 101 and an infrared element 102. An opening 103 is formed in a side surface of case 101. Infrared element 102 is housed in case 101. When electric power is supplied from light amount control unit 92 to infrared element 102, infrared element 102 generates heat and radiant light including infrared light is generated from infrared element 102. The radiant light is emitted from opening 103.

Light detector 91 includes a light detection element 911 and a signal processing unit 910. Light detection element 911 has a light reception sensitivity to a particular wavelength range of the exiting light from infrared light source 10. Light detection element 911 outputs a voltage V corresponding to light included in the wavelength range (sensitivity wavelength range) to light amount control unit 92 through signal processing unit 910. Examples of light detection element 911 can include an InGaAs-type photodiode having a light reception sensitivity to a near-infrared range, an SiPIN-type photodiode having a light reception sensitivity to a visible range (380 nm to 780 nm), and a color sensor. Signal processing unit 910 performs prescribed processing (e.g., AD (Analog-to-Digital) conversion) on a signal from light detection element 911, and outputs a signal corresponding to voltage V.

Light amount control unit 92 includes a differential amplifying unit 922 having a gain G, and a light source driving unit 123. Differential amplifying unit 922 amplifies a voltage difference $\Delta V_d$ between voltage V and a target voltage $V_0$, and outputs a signal $\Delta G_d$ ($=G \cdot \Delta V_d$) to light source driving unit 123. Light source driving unit 123 supplies electric power to infrared light source 10 such that voltage difference $\Delta V_d$ becomes zero. Light source driving unit 123 includes, for example, a DA converter, a differential amplifier, a voltage-current conversion circuit, a current detection resistance, and a feedback circuit. The voltage-current conversion circuit includes a transistor or a metal-oxide-semiconductor field effect transistor (MOSFET). Instead of the voltage-current conversion circuit, a pulse width modulation (PWM) modulation circuit and a bridge circuit may be used. The feedback circuit negatively feeds back a voltage of a current detected by the current detection resistance to the differential amplifier. Differential amplifying unit 922 is implemented by, for example, a firmware or an FPGA (Field Programmable Gate Array).

When $\Delta \beta$ represents a temperature coefficient of light detection element 911, $\Delta T_a$ represents a temperature difference between a temperature of light detector 91 and a reference temperature (e.g., temperature of light detector 91 when FTIR 100 is actuated), and $\Delta V$ represents a voltage difference corresponding to a difference between an amount of exiting light from infrared light source 10 and a target light amount, voltage V is expressed like the following formula (2):

$$V = V_0 + \Delta V + V_0 \cdot \Delta V \cdot \Delta \beta \cdot \Delta T_a \qquad (2).$$

Using a measurement value $V_{Ta}$ of voltage V in a constant temperature environment in which the temperature of light detector 91 is stable at $T_a$ and a measurement value $V_{Tb}$ of voltage V in a constant temperature environment in which the temperature of light detector 91 is stable at $T_b$ ($=T_a + \Delta T_{a0}$), temperature coefficient $\Delta \beta$ is expressed like the following formula (3):

$$\Delta \beta = \frac{V_{T_b} - V_{T_a}}{V_0 \cdot (V_{T_a} - V_0) \cdot \Delta T_{a0}}. \qquad (3)$$

Target voltage $V_0$ is a value predetermined by theoretical analysis and experiments in real machines as a voltage corresponding to the target light amount of the exiting light from infrared light source 10. Target voltage $V_0$ is determined such that temperature T of infrared element 102 becomes a certain temperature in the range of 1000 K to 1500 K. Target voltage $V_0$ may be selected by the user from a plurality of values predetermined as described above, or may be changeable by the user. At voltage V near target voltage $V_0$, a relationship between target voltage $V_0$ and temperature T is expressed as a linear equation like the following formula (4):

$$T = p \cdot V + q \qquad (4).$$

In the formula (4), each of a coefficient p and a constant term q is a device constant specific to FTIR 100, which is determined by, for example, a positional relationship between light detector 91 and infrared light source 10 in FTIR 100. Coefficient p and constant term q are known values measured preliminarily in a constant temperature environment in which a temperature around light detector 91 and infrared light source 10 is constant.

Based on the formula (2), mere voltage difference $\Delta V_d$ ($=V-V_0$) between voltage V and target voltage $V_0$ is expressed like the following formula (5):

$$\Delta V_d = \Delta V + V_0 \cdot \Delta V \cdot \Delta \beta \cdot \Delta T_a \qquad (5).$$

Based on the formula (5), voltage difference $\Delta V_d$ includes a value derived from a temperature characteristic of light detection element 911, in addition to voltage difference $\Delta V$. Since voltage difference $\Delta V_d$ is different from voltage difference $\Delta V$, feedback control based on voltage difference $\Delta V_d$ may in some cases have difficulty in bringing the amount of the exiting light from infrared light source 10 closer to the target light amount. In order to improve the accuracy of light amount control of infrared light source 10, feedback control based on voltage difference $\Delta V$ is necessary. In order to obtain voltage difference $\Delta V$ from the formula (2), it is necessary to obtain temperature difference $\Delta T_a$. However, the actual environment in which FTIR 100 is operating is not a constant temperature environment, and thus, it is difficult to obtain temperature difference $\Delta T_a$ of light detector 91 in real time. When temperature difference $\Delta T_a$ is unknown, voltage difference $\Delta V$ cannot be calculated from the formula (2).

Thus, in FTIR 100, a plurality of voltages output from a plurality of photodiodes having different sensitivity wavelength ranges are used to form a simultaneous equation of two or more linear equations with two unknowns in which voltage difference $\Delta V$ and temperature difference $\Delta T_a$ are unknown. Using the two linear equations with two unknowns, temperature difference $\Delta T_a$ can be eliminated, and thus, voltage difference $\Delta V$ can be derived. According to FTIR 100, feedback control can be performed based on voltage difference $\Delta V$ corresponding to the difference between the amount of the exiting light from infrared light source 10 and the target light amount, and thus, the accuracy of light amount control of infrared light source 10 can be improved.

Figure 4:
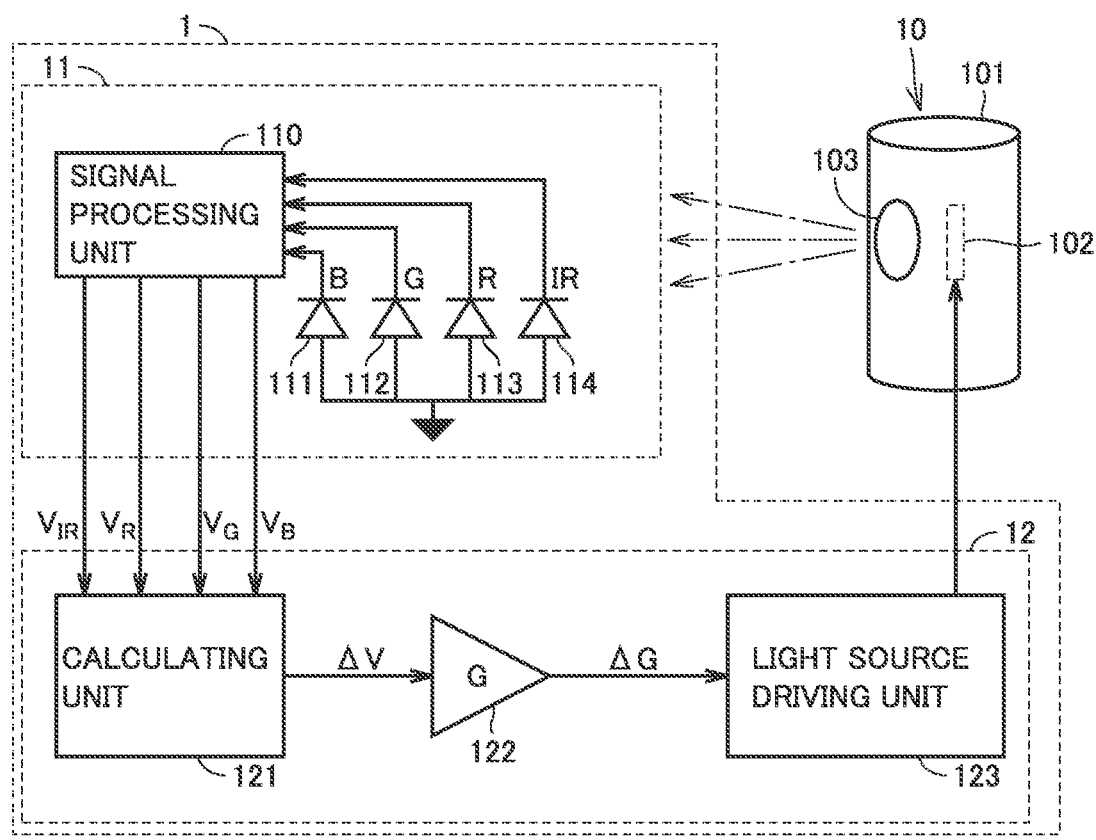
FIG. 4 shows a configuration of a light detector and a light amount control unit according to the embodiment.

FIG. 4 shows a configuration of monitor unit 1 according to the embodiment. In FIG. 4, infrared light source 10 and light source driving unit 123 are similar to infrared light source 10 and light source driving unit 123 shown in FIG. 3.

As shown in FIG. 4, light detector 11 includes a light detection element 111 (first light detection element), a light detection element 112 (second light detection element), a light detection element 113, a light detection element 114 (third light detection element), and a signal processing unit 110. Light amount control unit 12 includes a calculating unit 121, an amplifying unit 122 having gain G, and light source driving unit 123.

Figure 5:
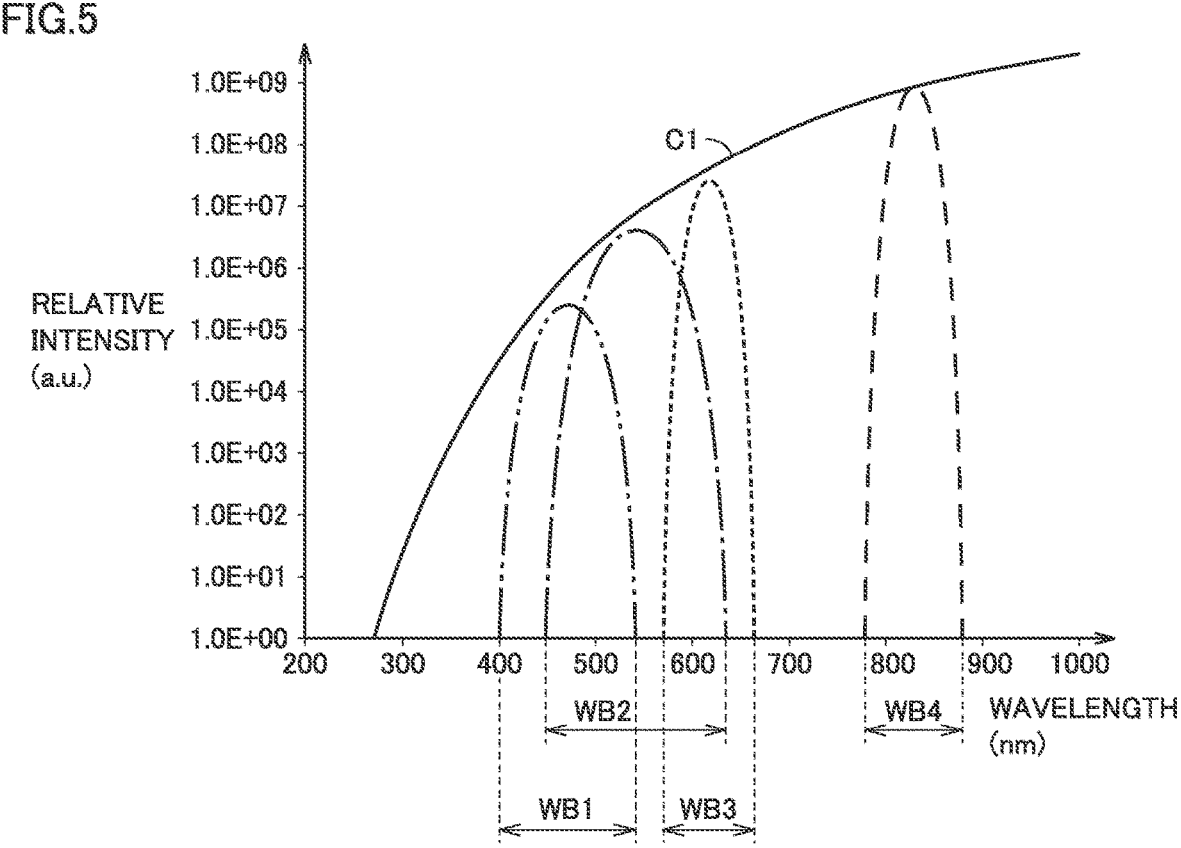
FIG. 5 shows a spectrum indicating sensitivity wavelength ranges of light detection elements included in the light detector in FIG. 4.

Light detection elements 111 to 114 have light reception sensitivities to a wavelength range WB1 (400 nm to 540 nm), a wavelength range WB2 (450 nm to 630 nm), a wavelength range WB3 (575 nm to 660 nm), and a wavelength range WB4 (785 nm to 885 nm) shown in FIG. 5, respectively. A curve Cl in FIG. 5 represents a spectrum of the exiting light from infrared light source 10 corresponding to curve C11 in FIG. 2.

Referring to FIGS. 4 and 5, light detection element 111 outputs a voltage $V_B$ corresponding to the light included in wavelength range WB1 to calculating unit 121 through signal processing unit 110. Light detection element 112 outputs a voltage $V_G$ corresponding to the light included in wavelength range WB2 to calculating unit 121 through signal processing unit 110. Light detection element 113 outputs a voltage $V_R$ corresponding to the light included in wavelength range WB3 to calculating unit 121 through signal processing unit 110. Light detection element 114 outputs a voltage $V_{IR}$ corresponding to the light included in wavelength range WB4 to calculating unit 121 through signal processing unit 110. Signal processing unit 110 performs prescribed processing (e.g., AD conversion) on signals from light detection elements 111 to 114, and outputs signals corresponding to voltages $V_B$, $V_G$, $V_R$, and $V_{IR}$ to calculating unit 121. Signal processing unit 110 includes, for example, an AD converter.

Calculating unit 121 calculates voltage difference $\Delta V$ from voltages $V_B$, $V_G$, $V_R$, and $V_{IR}$, and outputs voltage difference $\Delta V$ to amplifying unit 122. Amplifying unit 122 amplifies voltage difference $\Delta V$, and outputs a signal $\Delta G$ (=$G \cdot \Delta V$) to light source driving unit 123. Light source driving unit 123 supplies electric power to infrared light source 10 such that voltage difference $\Delta V$ becomes zero.

Each of calculating unit 121 and amplifying unit 122 is implemented by, for example, a firmware or an FPGA. Calculating unit 121 includes, for example, a subtractor constructed by a programming language or a hardware description language. Amplifying unit 122 includes, for example, an amplifier constructed by a programming language or a hardware description language as a configuration that amplifies a digital value. Amplifying unit 122 may include a digital-to-analog (DA) converter that converts a digital value to an analog value, and an operational amplifier that amplifies the analog value. When amplifying unit 122 outputs the analog value, light source driving unit 123 does not necessarily need to include the DA converter. Each of calculating unit 121 and amplifying unit 122 may be implemented by a processor such as a central processing unit (CPU) that executes a program stored in a memory. A process of deriving voltage difference $\Delta V$, which is performed by calculating unit 121, will be described below.

Similarly to voltage V given in the formula (2), each of voltages $V_B$, $V_G$, $V_R$, and $V_{IR}$ is expressed like the following formula (6):

$$\begin{bmatrix} V_B \\ V_G \\ V_R \\ V_{IR} \end{bmatrix} = \begin{bmatrix} V_{B0} \\ V_{G0} \\ V_{R0} \\ V_{IR0} \end{bmatrix} + \begin{bmatrix} \Delta V_B \\ \Delta V_G \\ \Delta V_R \\ \Delta V_{IR} \end{bmatrix} + \begin{bmatrix} V_{B0} \\ V_{G0} \\ V_{R0} \\ V_{IR0} \end{bmatrix} \cdot \begin{bmatrix} \Delta V_B \\ \Delta V_G \\ \Delta V_R \\ \Delta V_{IR} \end{bmatrix} \cdot \begin{bmatrix} \Delta \beta_B \\ \Delta \beta_G \\ \Delta \beta_R \\ \Delta \beta_{IR} \end{bmatrix} \cdot \begin{bmatrix} \Delta T_a \\ \Delta T_a \\ \Delta T_a \\ \Delta T_a \end{bmatrix}. \qquad (6)$$

The formula (6) is formed by integrating the following formulae (7A), (7B), (7C), and (7D):

$$V_B = V_{B0} + \Delta V_B + V_{B0} \cdot \Delta V_B \cdot \Delta \beta_B \cdot \Delta T_a \qquad (7A)$$

$$V_G = V_{G0} + \Delta V_G + V_{G0} \cdot \Delta V_G \cdot \Delta \beta_G \cdot \Delta T_a \qquad (7B)$$

$$V_R = V_{R0} + \Delta V_R + V_{R0} \cdot \Delta V_R \cdot \Delta \beta_R \cdot \Delta T_a \qquad (7C)$$

$$V_{IR} = V_{IR0} + \Delta V_{IR} + V_{IR0} \cdot \Delta V_{IR} \cdot \Delta \beta_{IR} \cdot \Delta T_a \qquad (7D).$$

In the following description, a plurality of formulae of the same type except for subscripts as in the formulae (7A) to (7D) are integrated and expressed like the formula (6).

In the formula (6), voltages $V_{B0}$, $V_{G0}$, $V_{R0}$, and $V_{IR0}$ are target voltages of light detection elements 111 to 114 corresponding to the target light amount of the exiting light from infrared light source 10, respectively. Voltage differences $\Delta V_B$, $\Delta V_G$, $\Delta V_R$, and $\Delta V_{IR}$ are voltage differences of light detection elements 111 to 114 corresponding to the difference between the amount of the exiting light from infrared light source 10 and the target light amount, respectively. Temperature coefficients $\Delta \beta_B$, $\Delta V_G$, $\Delta V_R$, and $\Delta V_{IR}$ are temperature coefficients of light detection elements 111 to 114, respectively. Temperature difference $\Delta T_a$ is similar to temperature difference $\Delta T_a$ in the formula (2).

Using band gains $\chi_B$, $\chi_G$, $\chi_R$, and $\chi_{IR}$ of light detection elements 111 to 114 and target voltage $V_0$, target voltages $V_{B0}$, $V_{G0}$, $V_{R0}$, and $V_{IR0}$ are expressed like the following formula (8):

$$\begin{bmatrix} V_{B0} \\ V_{G0} \\ V_{R0} \\ V_{IR0} \end{bmatrix} = \begin{bmatrix} \chi_B \\ \chi_G \\ \chi_R \\ \chi_{IR} \end{bmatrix} \cdot \begin{bmatrix} V_0 \\ V_0 \\ V_0 \\ V_0 \end{bmatrix}. \qquad (8)$$

In addition, using band gains $\chi_B$, $\chi_G$, $\chi_R$, and $\lambda_{IR}$ and voltage difference $\Delta V$, voltage differences $\Delta V_B$, $\Delta V_G$, $\Delta V_R$, and $\Delta V_{IR}$ are also expressed like the following formula (9):

$$\begin{bmatrix} \Delta V_B \\ \Delta V_G \\ \Delta V_R \\ \Delta V_{IR} \end{bmatrix} = \begin{bmatrix} \chi_B \\ \chi_G \\ \chi_R \\ \chi_{IR} \end{bmatrix} \cdot \begin{bmatrix} \Delta V \\ \Delta V \\ \Delta V \\ \Delta V \end{bmatrix}. \qquad (9)$$

At voltages $V_B$, $V_G$, $V_R$, and $V_{IR}$ near target voltages $V_{B0}$, $V_{G0}$, $V_{R0}$, and $V_{IR0}$, band gains $\chi_B$, $\chi_G$, $\chi_R$, and $\chi_{IR}$ are constant and calculated preliminarily.

Similarly to the formula (3), temperature coefficients $\Delta \beta_B$, $\Delta \beta_G$, $\Delta \beta_R$, and $\Delta \beta_{IR}$ are expressed like the following formula (10):

$$\begin{bmatrix} \Delta \beta_B \\ \Delta \beta_G \\ \Delta \beta_R \\ \Delta \beta_{IR} \end{bmatrix} = \begin{bmatrix} \dfrac{V_{B\_T_b} - V_{B\_T_a}}{V_{B0} \cdot (V_{B\_T_a} - V_{B0}) \cdot \Delta T_{a0}} \\ \dfrac{V_{G\_T_b} - V_{G\_T_a}}{V_{G0} \cdot (V_{G\_T_a} - V_{G0}) \cdot \Delta T_{a0}} \\ \dfrac{V_{R\_T_b} - V_{R\_T_a}}{V_{R0} \cdot (V_{R\_T_a} - V_{R0}) \cdot \Delta T_{a0}} \\ \dfrac{V_{IR\_T_b} - V_{IR\_T_a}}{V_{IR0} \cdot (V_{IR\_T_a} - V_{IR0}) \cdot \Delta T_{a0}} \end{bmatrix}. \qquad (10)$$

In the formula (10), voltages $V_{B\_Ta}$, $V_{G\_Ta}$, $V_{R\_Ta}$, and $V_{IR\_Ta}$ are measurement values of voltages $V_B$, $V_G$, $V_R$, and $V_{IR}$ in a constant temperature environment in which the temperature of light detector 11 is stable at $T_a$, respectively. Voltages $V_{B\_Tb}$, $V_{G\_Tb}$, $V_{R\_Tb}$, and $V_{IR\_Tb}$ are measurement values of voltages $V_B$, $V_G$, $V_R$, and $V_{IR}$ in a constant temperature environment in which the temperature of light detector 11 is stable at $T_b$, respectively.

At voltages $V_B$, $V_G$, $V_R$, and $V_{IR}$ near target voltages $V_{B0}$, $V_{G0}$, $V_{R0}$, and $V_{IR0}$, a relationship between voltages $V_B$, $V_G$, $V_R$, and $V_{IR}$ and temperature T of infrared element 102 is expressed as a linear equation like the following formula (11), similarly to the formula (4):

$$\begin{bmatrix} T \\ T \\ T \\ T \end{bmatrix} = \begin{bmatrix} p_B \\ p_G \\ p_R \\ p_{IR} \end{bmatrix} \cdot \begin{bmatrix} V_B \\ V_G \\ V_R \\ V_{IR} \end{bmatrix} + \begin{bmatrix} q_B \\ q_G \\ q_R \\ q_{IR} \end{bmatrix}. \quad (11)$$

In the formula (11), each of coefficients $p_B$, $p_G$, $p_R$, and $p_{IR}$ and constant terms $q_B$, $q_G$, $q_R$, and $q_{IR}$ is a device constant specific to FTIR 100, which is determined by, for example, a positional relationship between light detector 11 and infrared light source 10 in FTIR 100. Coefficients $p_B$, $p_G$, $p_R$, and $p_{IR}$ and constant terms $q_B$, $q_G$, $q_R$, and $q_{IR}$ are known values measured preliminarily in a constant temperature environment in which a temperature around light detector 11 and infrared light source 10 is constant.

In the formulae (7A) to (7D) into which the formulae (8) and (9) are substituted, voltage difference $\Delta V$ and temperature difference $\Delta T_a$ are unknown. That is, each of the formulae (7A) to (7D) is a linear equation with two unknowns. Using two linear equations with two unknowns selected from the formulae (7A) to (7D), temperature difference $\Delta T_a$ is eliminated and voltage difference $\Delta V$ is derived.

Due to multiple reflection or scattering of the HeNe laser light from laser light source 6 in interferometer 3, a part of the HeNe laser light may reach light detector 11. The wavelength (632.8 nm) of the HeNe laser light is included in wavelength range WB3 (575 nm to 660 nm) of light detection element 113. Therefore, the HeNe laser light reaching light detector 11 is a disturbance that deteriorates the accuracy in calculation of voltage difference $\Delta V$. Thus, calculating unit 121 calculates voltage difference $\Delta V$ without using the formula (7C) related to light detection element 113. Since an influence of the HeNe laser light that is a disturbance is excluded from the process of deriving voltage difference $\Delta V$, the accuracy of light amount control of infrared light source 10 can be further improved.

Voltage difference $\Delta V$ derived from the formula (7A) (first linear equation with two unknowns) and the formula (7B) (second linear equation with two unknowns), voltage difference $\Delta V$ derived from the formula (7B) and the formula (7D) (third linear equation with two unknowns), and voltage difference $\Delta V$ derived from the formula (7D) and the formula (7A) are expressed like the following formulae (12), (13) and (14), respectively:

$$\Delta V = \frac{1}{\chi_G} \cdot \frac{\chi_B \cdot \Delta\beta_B}{\chi_B \cdot \Delta\beta_B - \chi_G \cdot \Delta\beta_G} \cdot V_G - \frac{1}{\chi_B} \cdot \frac{\chi_G \cdot \Delta\beta_G}{\chi_B \cdot \Delta\beta_B - \chi_G \cdot \Delta\beta_G} \cdot V_B - V_0 \quad (12)$$

$$\Delta V = \frac{1}{\chi_{IR}} \cdot \frac{\chi_G \cdot \Delta\beta_G}{\chi_G \cdot \Delta\beta_G - \chi_{IR} \cdot \Delta\beta_{IR}} \cdot V_{IR} - \frac{1}{\chi_G} \cdot \frac{\chi_{IR} \cdot \Delta\beta_{IR}}{\chi_G \cdot \Delta\beta_G - \chi_{IR} \cdot \Delta\beta_{IR}} \cdot V_G - V_0 \quad (13)$$

$$\Delta V = \frac{1}{\chi_B} \cdot \frac{\chi_{IR} \cdot \Delta\beta_{IR}}{\chi_{IR} \cdot \Delta\beta_{IR} - \chi_B \cdot \Delta\beta_B} \cdot V_B - \frac{1}{\chi_{IR}} \cdot \frac{\chi_B \cdot \Delta\beta_B}{\chi_{IR} \cdot \Delta\beta_{IR} - \chi_B \cdot \Delta\beta_B} \cdot V_{IR} - V_0. \quad (14)$$

Calculating unit 121 outputs any of voltage differences $\Delta V$ expressed by the formulae (12) to (14) to amplifying unit 122. In order to improve the accuracy of voltage difference $\Delta V$, calculating unit 121 may output an average of three voltage differences $\Delta V$ expressed by the formulae (12) to (14) to amplifying unit 122.

In the embodiment, description has been given of the case in which the light detector includes the four light detection elements. However, the number of the light detection elements included in the light detector may be two or more, and is not limited to four.

Figure 6:
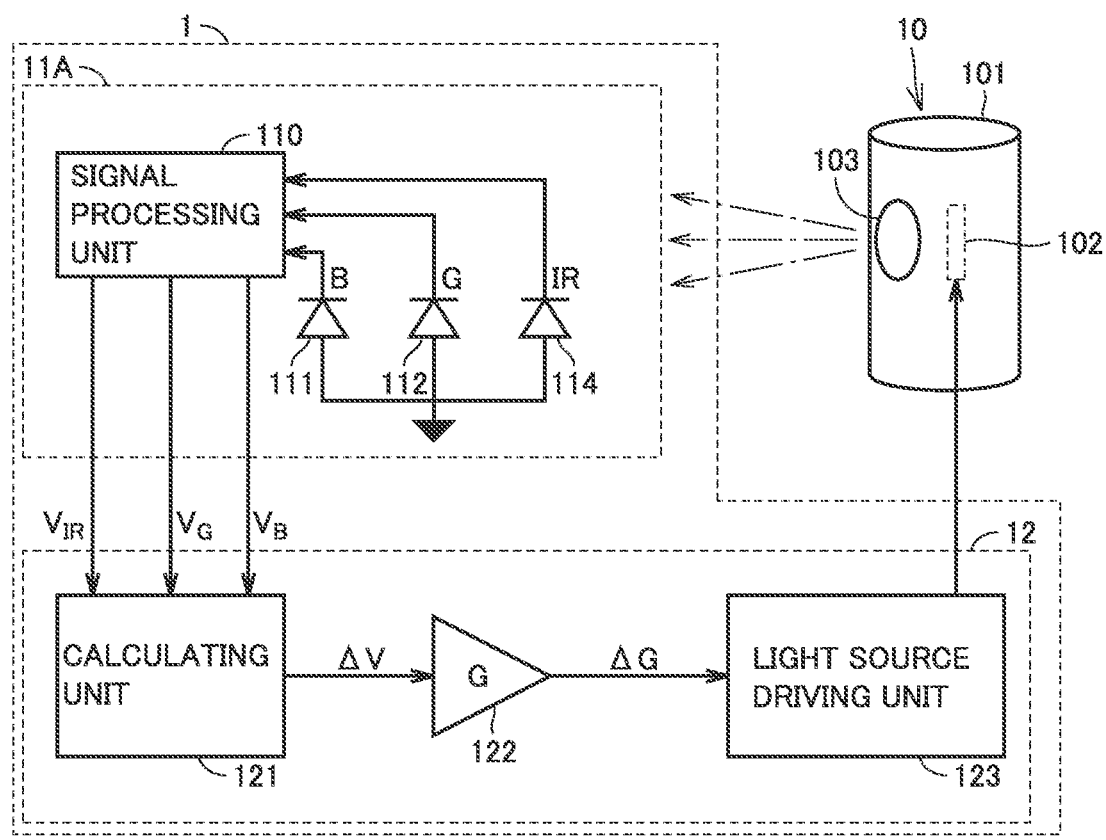
FIG. 6 shows a configuration of a light detector according to a first modification of the embodiment.

FIG. 6 shows a configuration of a light detector 11A according to a first modification of the embodiment. In the configuration of light detector 11A, light detection element 113 is removed from light detector 11 in FIG. 4. Since the remaining configuration is the same, description will not be repeated.

Figure 7:
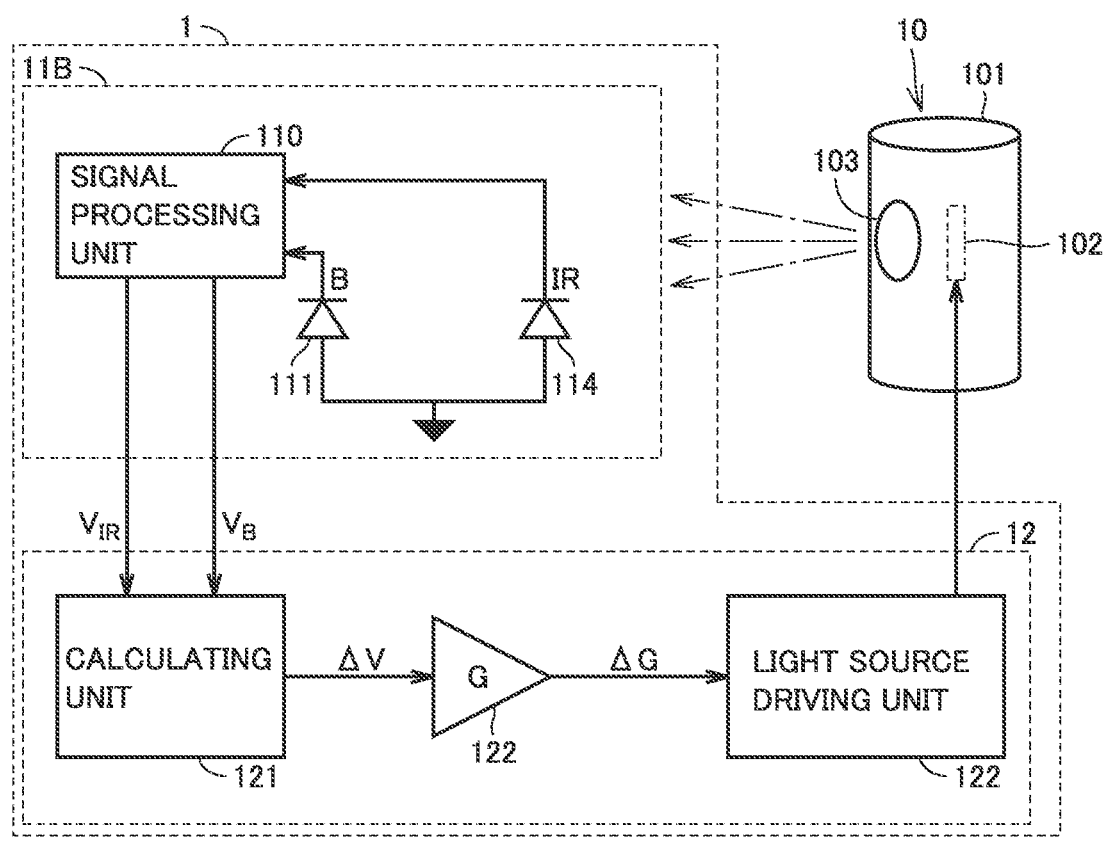
FIG. 7 shows a configuration of a light detector according to a second modification of the embodiment.

FIG. 7 shows a configuration of a light detector 11B according to a second modification of the embodiment. In the configuration of light detector 11B, light detection elements 112 and 113 are removed from light detector 11 in FIG. 4. Since the remaining configuration is the same, description will not be repeated.

As described above, according to the spectrophotometers of the embodiment and the first and second modifications, the accuracy of light amount control of the infrared light source included in each spectrophotometer can be improved.

Aspect

It should be understood by those skilled in the art that the above-described exemplary embodiment is a specific example of the following aspect.

(Clause 1) A spectrophotometer according to one aspect includes: an infrared light source; an interferometer; a first detector; and a monitor unit. The infrared light source emits exiting light including light having a wavelength within an infrared range. The interferometer generates interference light based on the exiting light input thereto. The first detector detects light generated based on the interference light that has been output from the interferometer, and has transmitted through or reflected from a sample. The monitor unit monitors an output of the infrared light source. The monitor unit includes: a second detector; and a light amount control unit. The second detector outputs a signal corresponding to an amount of the exiting light. The light amount control unit is operable to control the infrared light source such that the amount comes closer to a target light amount, based on the signal. The infrared light source emits light having a first wavelength range and light having a second wavelength range different from the first wavelength range. The second detector includes: a first light detection element; and a second light detection element. The first light detection element outputs to the light amount control unit a first voltage corresponding to the light having the first wavelength range. The second light detection element outputs to the light amount control unit a second voltage corresponding to the light having the second wavelength range.

In the spectrophotometer according to clause 1, the first voltage corresponding to the light having the first wavelength range and the second voltage corresponding to the light having the second wavelength range are output from the second detector to the light amount control unit. Therefore, the accuracy of light amount control of the infrared light source can be improved.

(Clause 2) In the spectrophotometer according to clause 1, the first voltage and the second voltage are expressed as a first linear equation with two unknowns and a second linear equation with two unknowns, respectively, each of the first linear equation with two unknowns and the second linear equation with two unknowns being a linear equation in which a voltage difference corresponding to a difference between the amount of the exiting light and the target light amount, and a temperature difference between a temperature of the second detector and a reference temperature are unknown. The first linear equation with two unknowns includes a temperature coefficient of the first light detection element and a band gain of the first light detection element. The second linear equation with two unknowns includes a temperature coefficient of the second light detection element and a band gain of the second light detection element. The light amount control unit controls the infrared light source based on the voltage difference derived from the first linear equation with two unknowns and the second linear equation with two unknowns.

In the spectrophotometer according to clause 2, using the two linear equations with two unknowns, the temperature difference can be eliminated, and thus, the voltage difference can be derived. As a result, feedback control can be performed based on the voltage difference corresponding to the difference between the amount of the exiting light from the infrared light source and the target light amount, and thus, the accuracy of light amount control of the infrared light source can be improved.

(Clause 3) In the spectrophotometer according to clause 2, the exiting light includes light having a third wavelength range different from each of the first wavelength range and the second wavelength range. The second detector further includes a third light detection element. The third light detection element outputs to the light amount control unit a third voltage corresponding to the light having the third wavelength range. The third voltage is expressed as a third linear equation with two unknowns, the third linear equation with two unknowns being a linear equation in which the voltage difference and the temperature difference are unknown. The third linear equation with two unknowns includes a temperature coefficient of the third light detection element and a band gain of the third light detection element. The light amount control unit controls the infrared light source such that an average of the voltage difference derived from the first linear equation with two unknowns and the second linear equation with two unknowns, the voltage difference derived from the second linear equation with two unknowns and the third linear equation with two unknowns, and the voltage difference derived from the third linear equation with two unknowns and the first linear equation with two unknowns comes closer to zero.

In the spectrophotometer according to clause 3, the infrared light source is controlled based on the average of the plurality of voltage differences. Therefore, the accuracy of light amount control of the infrared light source can be further improved.

(Clause 4) The spectrophotometer according to clause 1 further includes a monochromatic light source. The monochromatic light source emits monochromatic light for controlling the interferometer. At least one of the first wavelength range and the second wavelength range does not include a wavelength of the monochromatic light.

In the spectrophotometer according to clause 4, an influence of the monochromatic light that is a disturbance is excluded from the process of deriving the voltage difference. Therefore, the accuracy of light amount control of the infrared light source can be improved.

It should be noted that it has been intended from the time of filing of the present application to appropriately combine the configurations described in the embodiment and the modifications described above, including any combination which is not mentioned in the specification, within a range free of inconsistency or contradiction.

While the embodiment of the present invention has been described, it should be understood that the embodiment disclosed herein is illustrative and non-restrictive in every respect. The scope of the present invention is defined by the terms of the claims and is intended to include any modifications within the scope and meaning equivalent to the terms of the claims.

What is claimed is:

1. A spectrophotometer comprising:
   an infrared light source that emits exiting light including light having a wavelength within an infrared range;
   an interferometer that generates interference light based on the exiting light input thereto;
   a first detector that detects light generated based on the interference light that has been output from the interferometer, and has transmitted through or reflected from a sample; and
   a monitor unit that monitors an output of the infrared light source, wherein
   the monitor unit includes:
      a second detector that outputs a signal corresponding to an amount of the exiting light; and
      a light amount control unit that is operable to control the infrared light source such that the amount comes closer to a target light amount, based on the signal,
   the infrared light source emits light having a first wavelength range and light having a second wavelength range different from the first wavelength range, and
   the second detector includes:
      a first light detection element that outputs to the light amount control unit a first voltage corresponding to the light having the first wavelength range; and
      a second light detection element that outputs to the light amount control unit a second voltage corresponding to the light having the second wavelength range.

2. The spectrophotometer according to claim 1, wherein
   the first voltage and the second voltage are expressed as a first linear equation with two unknowns and a second linear equation with two unknowns, respectively, each of the first linear equation with two unknowns and the second linear equation with two unknowns being a linear equation in which a voltage difference corresponding to a difference between the amount and the target light amount, and a temperature difference between a temperature of the second detector and a reference temperature are unknown,
   the first linear equation with two unknowns includes a temperature coefficient of the first light detection element and a band gain of the first light detection element, the second linear equation with two unknowns includes a temperature coefficient of the second light detection element and a band gain of the second light detection element, and the light amount control unit controls the infrared light source based on the voltage difference derived from the first linear equation with two unknowns and the second linear equation with two unknowns.

3. The spectrophotometer according to claim 2, wherein the exiting light includes light having a third wavelength range different from each of the first wavelength range and the second wavelength range, the second detector further includes a third light detection element that outputs to the light amount control unit a third voltage corresponding to the light having the third wavelength range, the third voltage is expressed as a third linear equation with two unknowns, the third linear equation with two unknowns being a linear equation in which the voltage difference and the temperature difference are unknown, the third linear equation with two unknowns includes a temperature coefficient of the third light detection element and a band gain of the third light detection element, and the light amount control unit controls the infrared light source such that an average of the voltage difference derived from the first linear equation with two unknowns and the second linear equation with two unknowns, the voltage difference derived from the second linear equation with two unknowns and the third linear equation with two unknowns, and the voltage difference derived from the third linear equation with two unknowns and the first linear equation with two unknowns comes closer to zero.

4. The spectrophotometer according to claim 1, further comprising a monochromatic light source that emits monochromatic light for controlling the interferometer, wherein at least one of the first wavelength range and the second wavelength range does not include a wavelength of the monochromatic light.

* * * * *